United States Patent
Nielsen et al.

(10) Patent No.: US 7,047,834 B2
(45) Date of Patent: May 23, 2006

(54) ACTUATOR

(75) Inventors: Jens Jørgen Nielsen, Broager (DK); Howard Raarup, Sønderborg (DK)

(73) Assignee: Linak A/S, Nordborg (DK)

( * ) Notice: Subject to any disclaimer, the term of this patent is extended or adjusted under 35 U.S.C. 154(b) by 92 days.

(21) Appl. No.: 10/491,334

(22) PCT Filed: Oct. 2, 2002

(86) PCT No.: PCT/DK02/00655

§ 371 (c)(1),
(2), (4) Date: Apr. 1, 2004

(87) PCT Pub. No.: WO03/033946

PCT Pub. Date: Apr. 24, 2003

(65) Prior Publication Data

US 2004/0194564 A1    Oct. 7, 2004

(30) Foreign Application Priority Data

Oct. 3, 2001    (DK) .............................. 2001 01448

(51) Int. Cl.
*F16H 3/06*    (2006.01)
(52) U.S. Cl. .................................. 74/89.38
(58) Field of Classification Search .................. 74/841, 74/814, 127, 89.23, 89.3; 192/129 R, 150
See application file for complete search history.

(56) References Cited

U.S. PATENT DOCUMENTS

| | | | | |
|---|---|---|---|---|
| 2,881,619 A * | 4/1959 | Fox et al. | .................. | 376/228 |
| 3,258,985 A * | 7/1966 | Jordan | .......................... | 477/13 |
| 3,659,683 A * | 5/1972 | Betzing | ....................... | 188/162 |
| 4,715,315 A * | 12/1987 | Burford | ...................... | 118/684 |
| 4,858,481 A * | 8/1989 | Abraham | .................... | 74/89.38 |
| 5,329,657 A * | 7/1994 | Bartley et al. | ................. | 5/617 |
| 5,865,272 A * | 2/1999 | Wiggins et al. | ........... | 185/40 R |
| 6,158,295 A * | 12/2000 | Nielsen | ...................... | 74/89.38 |
| 2004/0117943 A1* | 6/2004 | Block et al. | ................ | 16/18 R |

FOREIGN PATENT DOCUMENTS

| | | |
|---|---|---|
| EP | 0 685 662 | 12/1995 |
| WO | 02/29284 | 4/2002 |

* cited by examiner

*Primary Examiner*—Roger Pang
(74) *Attorney, Agent, or Firm*—Dykema Gossett PLLC

(57) ABSTRACT

An actuator includes a quick release inserted in a transmission between an activating element (6) and a reversible electric motor (2) for releasing the activating element from the electric motor and the part of the transmission extending from the motor to the quick release. The quick release comprises two cylindrical coupling parts (8, 9) surrounded by a coupling spring (11) having outwardly bent ends, said ends being connected with their respective cylindrical elements (12, 13), seated to take part in the rotation of the coupling under normal circumstances, and wherein the two cylindrical elements (12, 13) with a release (14) are adapted to being rotated mutually to turn the ends of the spring away from each other, such that the spring (11) is released from at least one of the coupling (8, 9) for complete or partial release of the coupling. The two cylindrical elements (12, 13) are provided with an exterior toothing, and that the release (14) has a corresponding toothing (20) which may be caused to mesh therewith for mutual rotation of the cylinders.

9 Claims, 2 Drawing Sheets

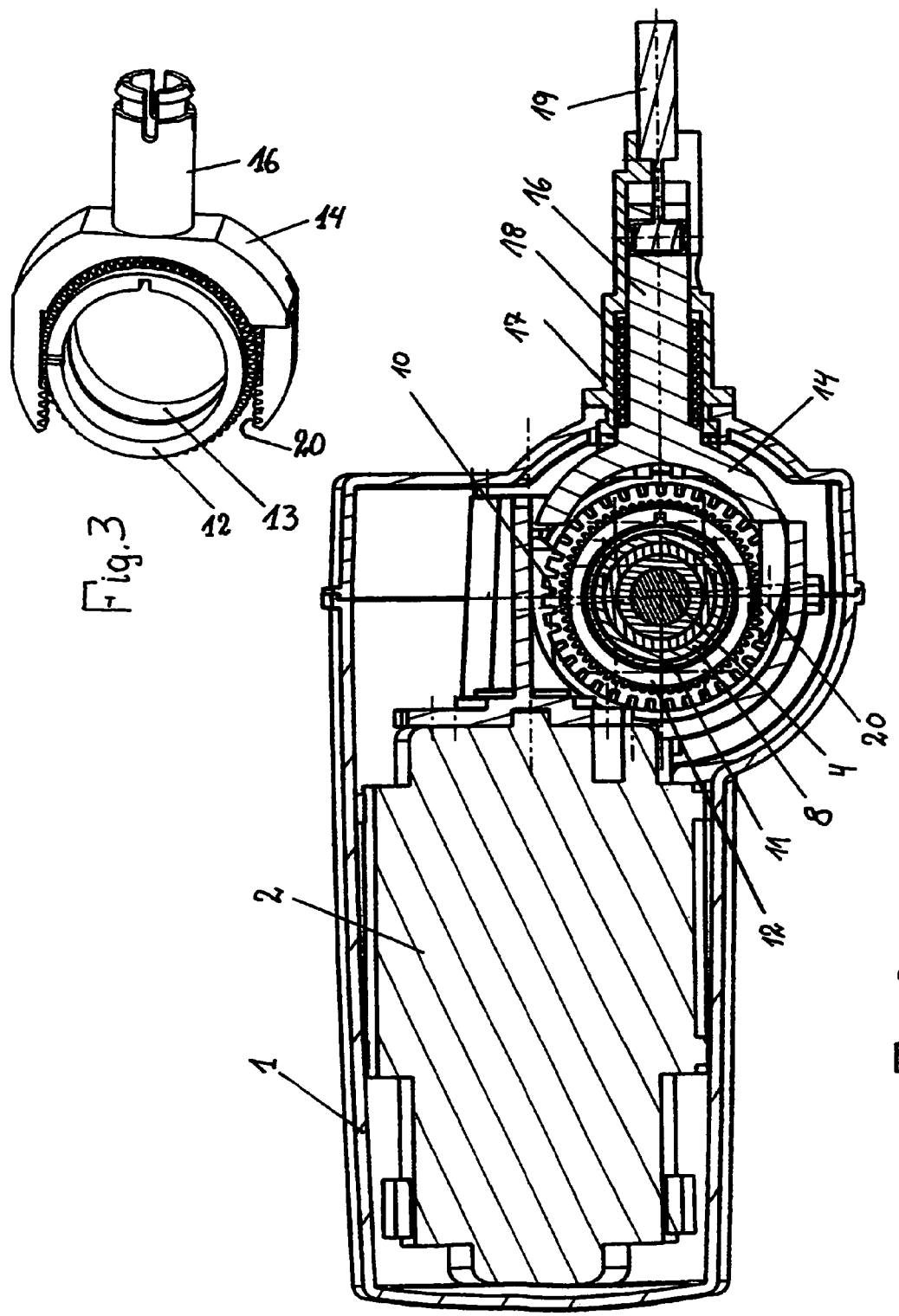

ACTUATOR

BACKGROUND OF THE INVENTION

FIELD OF THE INVENTION

THE PRIOR ART

An actuator having such quick release function is known from EP 0 685 662 to Linak A/S, and the present invention is a further development of this.

The example given in EP 0 685 662 of operating the quick release function is based on two cylindrical elements, where one with a Y-shaped rocker arm can be urged into the other, whereby the two cylinders due to a guideway are rotated in relation to each other. As a result the coupling spring is released, as its outwardly bent ends engaging tracks in the cylinders are rotated away from each other, causing the coupling spring to expand and thereby release its grip around the cylindrical coupling parts.

The present invention provides a different solution to operating the coupling.

SUMMARY OF THE INVENTION

The invention is characterized in that the two cylindrical elements are provided with an exterior toothing, and that the release has a corresponding toothing which may be caused to mesh therewith for mutual rotation of the cylinders. Hereby it is possible to construct the quick release just as short as the coupling spring used. In contrast, the quick release according to EP 0 685 662 is longer, as one of the cylindrical elements extends a distance beyond the spring. According to the invention, both cylindrical elements may be contained within the length of the spring, they may even be made shorter. There is the additional advantage that the elements may be identical. However, it is preferred that the elements abut each other and are formed with mutual guides.

The toothing may either be located on the curved surface of the cylinders or on the end faces thereof, the first mentioned location being preferred as this is obviously the simplest. Irrespective of the location, it will be understood that the extent of the toothing may be limited according to the desired movement. On the other hand, the simplest thing is that the toothing extends all the way around. On the curved surface, however, it may be an advantage to limit the width of the toothing according to the width of the release, such that the rest of the surface may be used for other purposes such as guide or braking surface.

The release may be designed as two separate elements which activate their respective cylindrical elements, but this basically complicates the construction.

A Y-shaped release where a first leg and a second leg are formed with a toothing which may be caused to mesh with the toothing on the one or the other cylindrical element, respectively, simplifies the construction and may be used in connection with a toothing on the curved surfaces of the cylindrical elements as well as on the end faces. With a toothing on the end faces directed toward each other, the release is arranged between the two cylindrical elements, otherwise the release rides over the two cylindrical elements in the longitudinal direction. Axial displacement of the release will then cause the two cylinders to rotate in opposite directions.

The construction may be configured such that the Y-shaped release, from a retracted position, is laterally displaced into mesh with the cylindrical elements. When the legs have a smooth portion from their dividing point and a distance downwards and with the toothing arranged on the outer part of the legs, the release may be seated down over the cylinders, and pulling thereof may cause the toothing to mesh with the cylindrical elements.

To avoid unintentional release of the quick release the release is spring-loaded to assume a rest position, where the toothing is not in mesh with the cylindrical elements.

This presents at the same time the possibility of operating the release by means of a cable. By pulling the cable the coupling may be completely disengaged, i.e. that the connection is completely interrupted. Alternatively, the coupling may be released in a controlled manner such that a partial release of the coupling is achieved, resulting in a controlled movement of the activating element. The cable may be mounted directly or indirectly on the release. In case the cable in the application of the actuator is in direct extension of the release, it is expedient to mount the cable directly on the release. If, on the other hand, the direction of the cable is perpendicular to the release, then the connection may be established by a mechanism which, when being operated, converts a rotary movement or an axial movement into a movement perpendicular thereto. An example are mechanisms based on a spindle and nut or a wedge-shaped disc.

BRIEF DESCRIPTION OF THE DRAWINGS

A linear actuator according to the invention will be described in more detail in the following with reference to the accompanying drawing, in which:

FIG. 2 shows a cross-section through the actuator,
and
FIG. 3 shows an enlarged view of the release for the quick release.

DETAILED DESCRIPTION OF THE PREFERRED EMBODIMENTS

Figure 1:
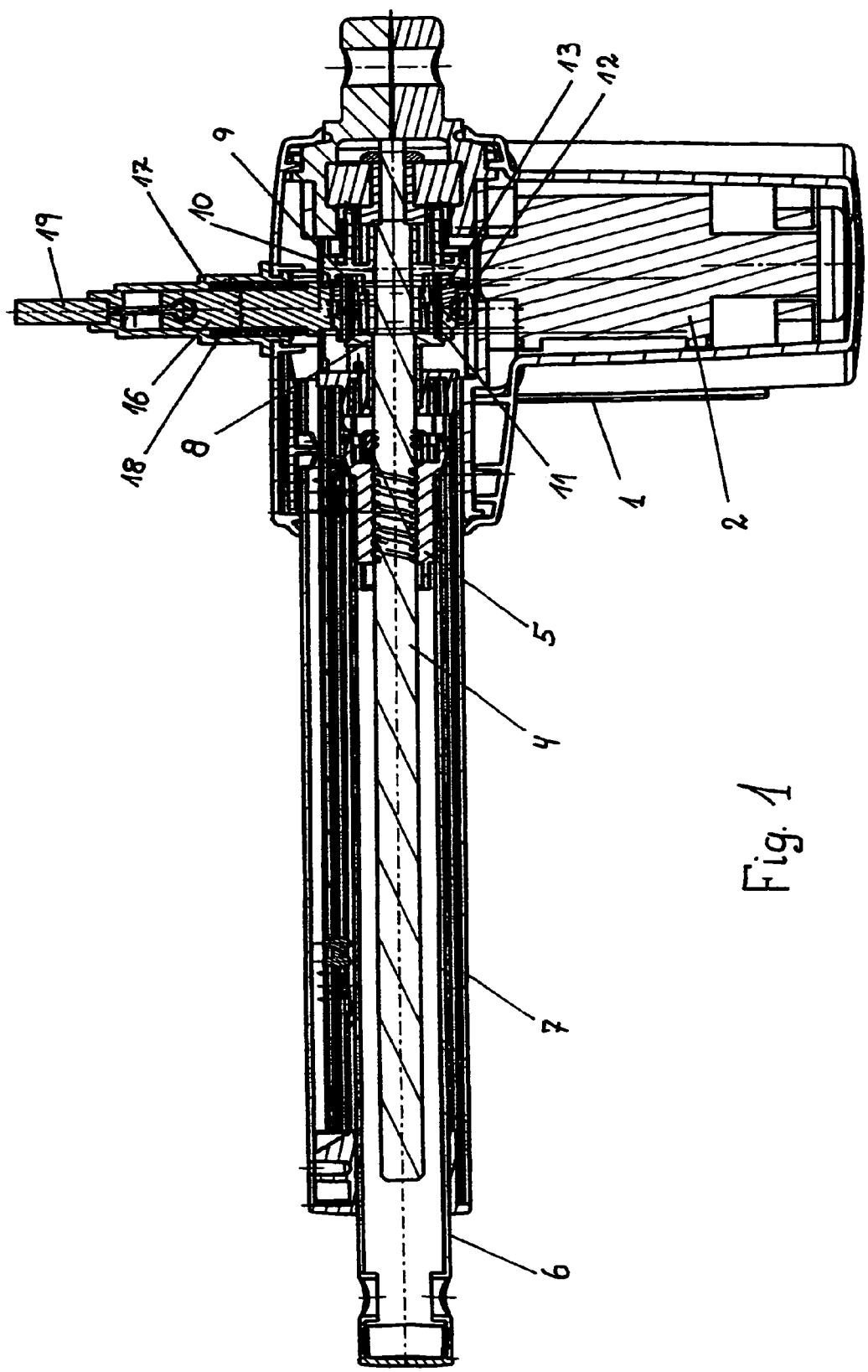
FIG. 1 shows a longitudinal section through the actuator.

As shown in the drawings, the main parts of the actuator are constituted by a housing 1 with a reversible electric motor 2 which, through a worm gear, drives a spindle 4 having a spindle nut 5 to which an activation rod 6 surrounded by an outer tube 7 is attached. The actuator is of the same type as described in the international application WO 02/29284 A1 to Linak A/S, and reference is made thereto.

The actuator has a quick release function comprising two coupling parts 8,9, where one part 8 is fitted permanently on the spindle, while the other part 9 is fitted permanently on the worm wheel 10 of the worm gear. More precisely, the side of the worm wheel facing the front end of the actuator is constructed with a cylindrical section, upon which a bushing with a corbie-step is fixed. The coupling part 8 on the spindle is constructed with a bowl which is seated over this corbie-step. A coupling spring 11 is fitted around the two parts 8,9, extending between the side of the worm wheel and a collar on the coupling part 8. In normal conditions, the spring 11 couples the two coupling parts 8,9 together, such that the spindle is connected to the motor via the worm gear.

Around the coupling spring 11 there are two cylindrical elements 12,13 provided with an exterior toothing. The ends of the coupling spring 11 are bent radially outwards and are embedded in their respective elements.

A Y-formed release 14 rides with its legs over the two cylindrical elements 12,13 such that one leg is opposite to one element, while the other leg 15 is seated down over the other element 13. The upper portion of the legs is smooth, while the lower portion is provided with a toothing to engage the toothing on the elements 12,13.

The neck 16 of the Y-formed release 14 is controlled in a sleeve 17 fixed to the housing. On the neck there is a spring 18 which tightens between a shoulder in the opening of the sleeve and the upper side of the release, such that the release is spring-loaded in a parking position, where the lowest, toothed part of the legs is out of contact with the two cylindrical elements 12,13. A cable 19 connected to a operating handle (not shown) is fixed to the top end of the neck.

When the handle is pulled, the release is pulled up, as shown in FIG. 2, until the lower toothed part 20 of the legs engages the respective cylindrical elements 12,13, which are then turned opposite each other. The ends of the spring will then be pulled from each other, one clockwise and the other counterclockwise. In this way the spring will expand, i.e. its internal diameter will increase and the two coupling parts 8,9 are then released. The spindle will then be released and can rotate freely. If the activation rod 6 is under load and if it is in an extended position, it will then be pushed inwards, depending on the load being able to overcome the self-locking ability of the spindle.

Although the embodiment relates to a linear actuator, it is obvious, as is also apparent from the claims, that the invention is also applicable in rotary actuators, e.g. of the type described in WO 01/17401 A1 to Linak A/S.

The invention claimed is:

1. An actuator, wherein a quick release is inserted in a transmission between an activating element and a reversible electric motor for releasing the activating element from the electric motor and a part of the transmission extending from the motor to the quick release, said quick release comprising two cylindrical coupling parts surrounded by a coupling spring having outwardly bent ends, said ends being connected with respective cylindrical elements, seated to take part in the rotation of the coupling under normal circumstances, and wherein the two cylindrical elements with a release are adapted to being rotated mutually to turn the ends of the spring away from each other, such that the spring is released from at least one of the coupling parts for complete or partial release of the coupling, wherein the two cylindrical elements are provided with an exterior toothing, and wherein the release has a corresponding toothing which may be caused to mesh therewith for mutual rotation of the cylinders.

2. An actuator according to claim 1, wherein the cylindrical elements include a toothing on curved surfaces thereof.

3. An actuator according to claim 2, wherein the cylindrical elements include a toothing on an end face.

4. An actuator according to claim 2, wherein the toothing is annular.

5. An actuator according to claim 2, wherein a width of the toothing only extends over a portion of the length of the cylinders.

6. An actuator according to claim 1, wherein the release is Y-shaped, where a first leg and a second leg include a toothing which may be caused to contact the toothing on the one or the other cylindrical element, respectively.

7. An actuator according to claim 6, wherein the legs have a smooth portion from their dividing point and a distance downwards, while the toothing is arranged on a distal part of the legs.

8. An actuator according to claim 7, wherein the release is spring-loaded to assume a rest position, where the toothing is out of mesh with the cylindrical elements.

9. An actuator according to claim 8, wherein the release is connected directly or indirectly with a cable provided with an operating handle.

* * * * *